United States Patent [19]

Osato

[11] Patent Number: 5,591,515
[45] Date of Patent: Jan. 7, 1997

[54] MAGNETIC RECORDING MEDIUM WITH A RECORDING LAYER COMPOSED OF LAMINATE STRUCTURE OF MAGNETIC FILMS AND NON-MAGNETIC FILMS, AND METHOD FOR PRODUCING THE SAME

[75] Inventor: Yoichi Osato, Yokohama, Japan

[73] Assignee: Canon Kabushiki Kaisha, Tokyo, Japan

[21] Appl. No.: 376,672

[22] Filed: Jan. 23, 1995

Related U.S. Application Data

[63] Continuation of Ser. No. 379,947, Jul. 14, 1989, abandoned.

[30]    Foreign Application Priority Data

Jul. 15, 1988   [JP]   Japan .................. 63-174966

[51] Int. Cl.$^6$ ....................................... G11B 5/66
[52] U.S. Cl. ................ 428/212; 428/336; 428/694 MT; 428/694 NF; 428/694 XS; 428/694 MM; 428/694 T; 428/694 TS; 428/694 TM; 427/127; 427/128; 427/129; 427/130
[58] Field of Search ............... 428/694 T, 694 TS, 428/694 TM, 336, 900, 694 MT, 694 NF, 694 XS, 694 MM, 212; 427/127, 128, 129, 130

[56]          References Cited

U.S. PATENT DOCUMENTS 4,578,322  3/1986  Sawamura et al. ............ 428/694 MM
4,789,606  12/1988  Yamada ........................... 428/694
4,837,118  6/1989  Yamamoto ....................... 428/645
4,922,454  5/1990  Taki ................................ 365/122

FOREIGN PATENT DOCUMENTS 058641  3/1988  Japan .

*Primary Examiner*—Leszek Kiliman
*Attorney, Agent, or Firm*—Fitzpatrick, Cella, Harper & Scinto

[57]          ABSTRACT

A magnetic recording medium with a superior magnetic properties and a high anticorrosive resistance comprises a substrate and a magnetic recording layer formed on the substrate. The magnetic recording layer is composed of first thin films comprising a rare earth-transition metal magnetic alloy and second thin films comprising a non-magnetic material composed of either one of a metal, a semiconductive material or a dielectric material, laminated in at least two sets. Total thickness of a set of the first and second films is within a range from 15 to 100 Å.

A method for preparing the magnetic recording medium comprises a first step for forming a thin film from a rare earth-transition metal magnetic alloy on the substrate and a second step for forming a thin film from a non-magnetic material composed of a metal, a semiconductive material or a dielectric material on the substrate, wherein the first and second steps are alternately repeated at least two cycles while rotating the substrate.

11 Claims, 1 Drawing Sheet

MAGNETIC RECORDING MEDIUM WITH A RECORDING LAYER COMPOSED OF LAMINATE STRUCTURE OF MAGNETIC FILMS AND NON-MAGNETIC FILMS, AND METHOD FOR PRODUCING THE SAME

This application is a continuation of application Ser. No. 07/379,947 filed Jul. 14, 1989, now abandoned.

BACKGROUND OF THE INVENTION

1. Field of the Invention

The present invention relates to a magnetic recording medium for use in a large-capacity memory, an electronic filing-system or the like, and a method for producing the same.

2. Related Background Art

The magnetooptical recording medium is already known as an erasable recording medium. Crystalline materials such as garnet and intermetal compounds such as MnBi were investigated as the material for forming such magnetooptical recording media but recent developments are directed toward a recording layer utilizing rare earth elements such as Tb, Gd and Dy and alloys of transition metals such as Fe and Co. The rare earth-transition metal alloy film has various advantages such as a large magnetooptical effect, a freedom in the selection of Curie temperature (substantially equal to recording temperature) by the adjustment of the composition, and absence of noise resulting from the grain boundary inherent to crystalline materials.

On the other hand, the deterioration of recording characteristics in prolonged storage or use is a major concern because the rare earth elements are very active and apt to undergo deteriorating reactions such as oxidation or nitro-generation even at room temperature.

The current countermeasure consists of the addition, to the materials constituting the recording layer, of an additive capable of improving the anticorrosive resistance such as Ti, Cr or Al, but it is impossible to obtain sufficient anticorrosive power without sacrificing the magnetooptical effect and the vertical magnetic anisotropy. Therefore, as a second best measure, there is employed a method of sandwiching the recording layer with the elaborate protecting film such as oxide, nitride or carbide films.

However, since the recording layer itself is easily deteriorated by reaction, it is significantly influenced, in the process of formation of the recording layer, by the gas emitted from the substrate, or the gas remaining in the vacuum chamber, and the variation of magnetic properties is inevitable with several days to several months after the preparation of the magnetooptical recording medium.

SUMMARY OF THE INVENTION

The object of the present invention is to provide a magnetic recording medium free from the aforementioned drawbacks of the prior technology, and provided with satisfactory magnetic properties and a high anticorrosive resistance, and a method for producing such recording medium.

The above-mentioned object can be attained according to the present invention by a magnetic recording medium comprising:

a substrate; and a magnetic recording layer formed on said substrate and composed of first thin films of a rare earth-transition metal magnetic alloy, and second thin films of a non-magnetic material composed of a metal, a semiconductive material or a dielectric material, laminated alternately in at least two sets, wherein a set of the first and second thin films has a summed thickness in a range of 15 to 100 Å.

The above-mentioned magnetic recording medium is prepared, while rotating the substrate, by alternately repeating, at least two cycles:

(a) a first step for forming, on said substrate, a thin film composed of a rare earth-transition metal magnetic alloy; and (b) a second step for forming, on said substrate, a thin film of a non-magnetic material composed of a metal, a semiconductive material or a dielectric material.

DESCRIPTION OF THE PREFERRED EMBODIMENTS

Now the present invention will be clarified in detail by an embodiment thereof applied to a magnetooptical disk and shown in the attached drawings.

Figure 1:
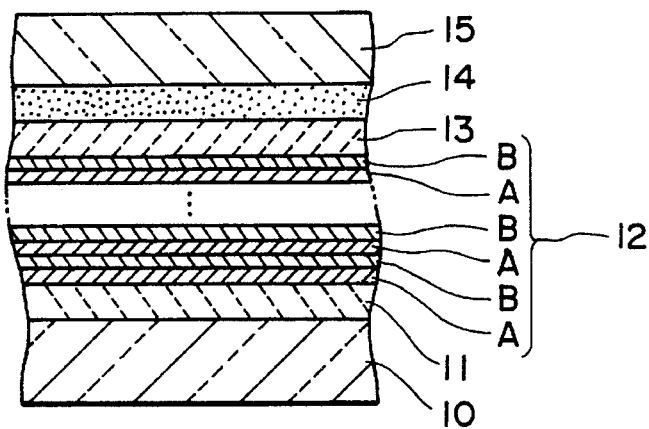
FIG. 1 is a schematic cross-sectional view of an embodiment of the magnetic recording medium of the present invention.

FIG. 1 is a schematic cross-sectional view of an embodiment of the magnetooptical disk of the present invention, wherein, on a disk-shaped transparent substrate 10 comprising glass, a plastic material or the like, there are formed in succession, a subbing layer 11 composed of a dielectric material such as $Si_3N_4$, a magnetic recording layer 12 and a protective layer 13 composed of a dielectric material such 12 $Si_3N_4$. A protective plate 15 comprising glass, a plastic material or the like is adhered by an adhesive layer 14 onto the protective layer 13.

The magnetic recording layer 12 is composed of first thin films A (hereinafter called layers A) comprising a rare earth-transition metal magnetic alloy and second thin films B (hereinafter called layers B) comprising a non-magnetic material, alternately laminated in at least two sets (e.g., wherein at least two first thin films A and two second thin films B are alternately laminated). These "sets" are also sometimes called a "laminated pair".

Examples of the rare earth element constituting the layers A include Tb, Gd, Dy, Nd and Ho, while those of the transition metal element include Fe, Co and Ni. Thus the magnetic alloy layer A is formed from at least an element selected from each of two groups mentioned above. The atomic ratio of the rare earth element to the transition metal element is preferably about 1:9 to 5:5, but this range is dependent on the elements to be selected, and also the thickness of the layer as will be explained later. Consequently said ratio can be suitably selected so as to obtain desired properties. Also there may be included other elements than above.

The layers B are composed of a nonmagnetic material which is either a metal, a semiconductive material or a dielectric material. Specific examples include Ti, Cr, Si, $TbF_3$, ZnS, $Si_3N_4$, SiN, SiO and $Al_2O_3$, and particularly preferred is an active material capable of easily combining with oxygen, water or nitrogen which is reactable with the rare earth elements or of forming a satisfactory protective film, such as Si, $Si_3N_4$ or $Al_2O_3$.

The magnetic recording layer of the present invention is composed of repeating structure cycles each consisting of a layer A and a layer B. The summed thickness of a set of the layer A and the layer B is from 15 to 100 Å. As the thickness of the magnetic recording layer is in the usual range of 500 to 2000 Å, there are laminated 5 to 130 sets of the layers A and B in the entire recording layer.

The thickness of the repeating structure cycle affects the magnetic anisotropy, magnitude of magnetization, Curie temperature etc., and a thinner (smaller thickness) leads to a lower Curie temperature, a higher recording sensitivity, and an improved resistance to deterioration, but the recording layer becomes more difficult to use because of a reduced vertical magnetic anisotropy and a reduced coercive force. Consequently the thickness of the repeating structure cycle should not be excessively small but is preferably in a range of 15 to 100 Å. Also a thickness exceeding 100 Å is not desirable because of a lowered resistance to deterioration, and an increase in the Curie temperature. However a recording film with a repeating laminate structure is superior, even when the thickness of said repeating structure exceeds 100 Å, in the resistance to deterioration by reaction and in the coercive force, to a single-layered film.

The ratio in volume (thickness) of the magnetic alloy layers A to the non-magnetic layers B is from about 5:5 to 9:1, and the preferred thickness of the layer A is from 10 to 90 Å. An excessively thick layer B is not desirable because of the reduction in the coercive force.

Also the above-mentioned periodic structure can be composed of different magnetic alloy layers A', A", A''', ... and different non-magnetic layers B', B", B''', .... For example there may be adopted a periodical structure A'-B'-A'-B" wherein A' is a $Dy_{25}Fe_{75}$ alloy layer, B' is a Si semiconductive layer, A" is a $Gd_{20}Fe_{50}Co_{30}$ alloy layer and B" is an $Al_2O_3$ dielectric layer, thereby suitably regulating the magnetic anisotropy, magnitude of magnetization, Curie temperature and resistance to deterioration by reaction. The layers A' and A", or B' and B" need not have a same thickness. In the above-mentioned example, there may be obtained a recording film in which the Curie temperature is located between those of the layers A' and A".

In the recording layer of the present invention, the layers A and B are preferably separated as completely as possible. More specifically, the contamination of the layer A with the element of the layer B reduces the vertical magnetic anisotropy, as a result providing a magnetic anisotropy in the direction of the plane of the recording layer, and also reduces the resistance to deterioration by reaction.

Because of the periodical deposition structure, the recording film has an excellent resistance to deterioration by reaction, is not receptive to gaseous components that may be incorporated in slight amounts during preparation, and easily provides a high coercive force.

In the following there will be explained the method for producing said periodical deposition structure.

Figure 2:
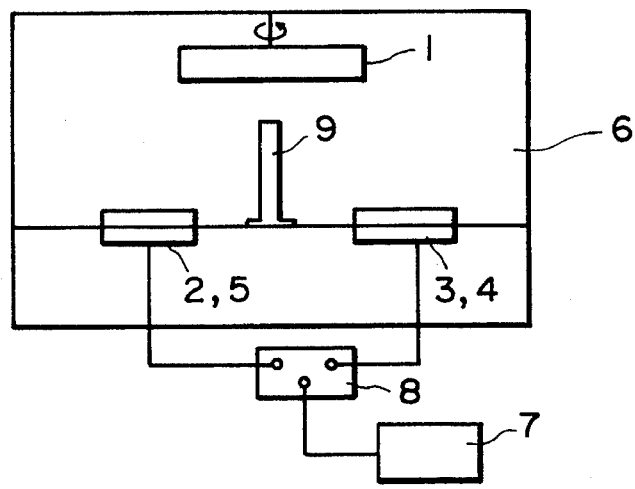
FIGS. 2 and 3 are respectively a schematic cross-sectional view and a schematic plan view of a sputtering apparatus employed in the preparation of the magnetic recording medium of the present invention.
Figure 3:
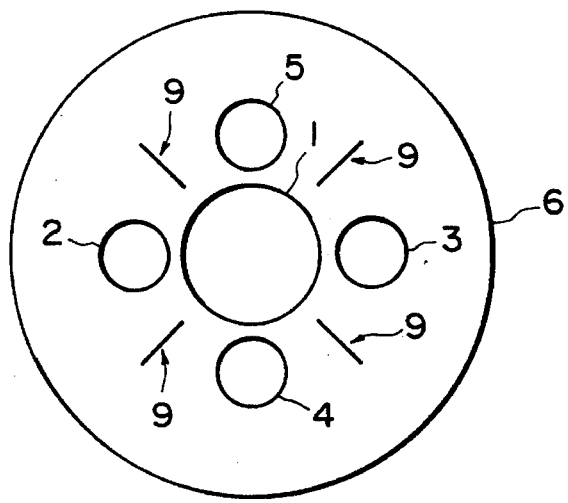

FIGS. 2 and 3 are respectively a cross-sectional view and a plan view, of an example of the vacuum chamber of a sputtering apparatus for forming the magnetooptical recording layer of the present invention. Referring to FIG. 2, substrates are set on a rotatable substrate holder 1. Sputtering targets 2,3 are composed of rare earth-transition metal magnetic alloy, while sputtering targets 4, 5 are composed of a non-magnetic material.

Though there are provided four targets, there are at least required a magnetic alloy target and a non-magnetic target. Also the targets 2, 3 may be composed of different alloys, and the targets 4, 5 may be composed of different non-magnetic materials.

After the vacuum chamber 6 is evacuated, the pressure therein is regulated to a predetermined value by introducing for example argon gas. Then the substrates are rotated, and high-frequency electric powers are supplied to the targets to effect the sputtering for a suitable time, whereby the recording layer of periodical laminate structure can be obtained.

The high-frequency electric power for evaporating the target can be suitably selected according to the desired film thickness for the magnetic alloy target or the non-magnetic target. The electric power is increased in relative manner if a higher proportion of the magnetic alloy is desired. Also in case there are plural materials, the electric power may be adjusted to suitably adjust each thicknesses of said materials.

The thickness of the structure cycle can be regulated by varying the revolution of the substrate holder 1. A larger revolution provides a thinner structure cycle, and a small revolution provides a thicker structure cycle.

Shield plates 9 may be provided in order to prevent the mixing the magnetic alloy and the non-magnetic material. The height of said shield plates is about 20% to 100% of the distance between the plane of targets and that of the substrate holder.

Though FIG. 2 shows an example of high-frequency sputtering, there may be also employed vacuum evaporation or DC ion plating as long as the structure is similar.

On each sample, the magnetization curve is measured with a vibration sample magnetometer (VSM) to determine the Curie temperature, the magnetization in the vertical direction and in the in-surface direction in the presence of applied magnetic field causing the inversion of the magnetization, and the coercive force in the vertical direction.

Also as a measure of the resistance to deterioration by reaction, level of corrosion for each sample is investigated after standing in 0.5N sodium chloride solution for one hour. In the evaluation of the results of corrosion test, "X" indicates total dissolution of the magnetooptical recording layer; "Δ" indicates partial dissolution; "o" indicates no dissolution but color change on the surface; and "⊙" indicates no change.

Also the thickness of the structure cycle is measured by ion etching of the magnetooptical recording layer, combined with the analysis of surface composition by an electron spectroscopy.

EXAMPLES 1–9

A glass substrate was set on the substrate holder 1 shown in FIG. 2. 5 inches alloy targets composed of $Tb_{20}Fe_{60}Co_{20}$ (atomic ratio) were used as the sputtering targets 2, 3, and 5 inches targets composed of $Si_3N_4$ (atomic ratio) were used as the sputtering targets 4, 5. The plane of the targets is distanced by 80 mm from the plane of the substrate holder 1, and the distance between the centers of neighboring targets was 200 mm. A shield plate 9 of a height of 70 mm was provided at the center between the neighboring targets.

After the vacuum chamber 6 was evacuated to $1\times10^{-5}$ Pa, the pressure therein was adjusted to $3\times10^{-1}$ Pa by the introduction of argon gas. Then the substrate was rotated, and high-frequency electric powers of 200 W and 50 W were respectively supplied the targets 2, 3 and the targets 4, 5 to effect the sputtering in such a manner that $Si_3N_4$ occupies 20 vol. % in the magnetooptical recording layer. A magnetooptical recording layer of a thickness of ca. 1200 Å, with a periodical structure, was obtained by film formation for about 6 minutes. The revolution of the substrate holder 1 was varied from 0.67 to 40 rpm to obtain different structure cycles shown in Tab. 1.

The characteristics of the obtained samples are summarized in Tab. 1. The measurement of the Curie temperature could not be obtained in the example 1 which was a surface magnetizable film, since it was determined from the magnetization curves measured in the vertical direction at various temperatures.

For comparison, a sample of the Reference Example 1 having a single TbFeCo layer of a thickness of ca. 1200 Å was prepared with the targets 2, 3 only and subjected to similar measurements. The obtained results are also shown in Tab. 1.

The results in Tab. 1 indicate that the samples of the examples have a higher anticorrosion resistance, and a higher recording sensitivity due to the lower Curie temperature, in comparison with the conventional single-layered sample (Reference Example 1). Further referring to Tab. 1, the magnetic anisotropy, magnitude of magnetization and Curie temperature vary depending on the dimension of structure cycle, but recording layers with the structure cycle of 15 to 100 Å (Examples 3–7) have a relatively high coercive force, an appropriate Curie temperature and a high anticorrosion resistance, and are excellent in overall performance.

TABLE 1

| Sample | Structure cycle (Å) | Coercive force (Oe) | Vertical magnetization (emu/cc) | In-surface magnetization (emu/cc) | Curie temp. (°C.) | Corrosion test |
| --- | --- | --- | --- | --- | --- | --- |
| Example 1 | 5 | 50 | 5 | 40 | — | ⊚ |
| ↓ 2 | 10 | 2500 | 50 | 30 | 130 | ⊚ |
| ↓ 3 | 15 | 4000 | 57 | 20 | 160 | ⊚ |
| ↓ 4 | 20 | 4500 | 60 | 10 | 180 | ⊚ |
| ↓ 5 | 30 | 4800 | 65 | 5 | 200 | ⊚ |
| ↓ 6 | 50 | 5000 | 70 | ≦5 | 220 | ⊚ |
| ↓ 7 | 100 | 7000 | 75 | ≦5 | 250 | ⊚ |
| ↓ 8 | 150 | 7600 | 80 | ≦5 | 265 | ○ |
| Example 9 | 300 | 8000 | 80 | ≦5 | 265 | Δ |
| Ref. Ex. 1 | — | 8000 | 80 | ≦5 | 270 | x |

REFERENCE EXAMPLE

Samples of Reference Examples 2–6 were prepared in a similar manner as in the Examples 1–9 and the Reference Example 1, but with the following alteration.

5 inches alloy targets of a composition $Tb_{20}Fe_{60}Co_{20}$ (atomic ratio) were set as the sputtering targets 2, 3, 4 and 5, and $Si_3N_4$ chips of 10 mm square were adhered on said targets to obtain $TbFeCo/Si_3N_4$ composite targets. The samples of the Reference Examples 2 to 5 were prepared by varying the number of the $Si_3N_4$ chips. The revolution of the substrate was 4 rpm, and a film of 1200 Å was obtained in 6 minutes.

Also the sample of the Reference Example 6 was prepared in a similar manner as in the Examples 1–9 except that the substrate was not rotated, and a film of ca. 1200 Å was obtained in about 8 minutes.

The samples of the Reference Examples 2–6 were evaluated as in the Examples 1–9, and the obtained results are summarized in Tab. 2.

The results of the Reference Examples 2–5 shown in Tab. 2 indicate that a system in which $Si_3N_4$ is dispersed-added to TbFeCo shows a lowering of the Curie temperature with the addition of a small amount, thus exhibiting in-surfacial magnetic anisotropy, and is unable to provide a satisfactory anticorrosion resistance. Also the results of the Reference Example 6 indicate that the film obtained without rotation of the substrate cannot be used as the recording film because of the lower vertical magnetic anisotropy even if $Si_3N_4$ is contained in the same ratio (20 vol. %) as in the Examples 1–9.

EXAMPLE 10

A sample was prepared in a similar manner as in the Examples 1–9 except that the shield plates between the targets were removed. The revolution of the substrate was 4 rpm, and a film of 1500 Å was obtained in 6 minutes. Due to the absence of the shield plates for avoiding the mixing of neighboring layers during film formation, the obtained sample showed a lowered vertical anisotropy even in the presence of $Si_3N_4$ in the same ratio (20 vol. %) as in the Examples 1–9, but showed an excellent anticorrosive resistance, as shown in Tab. 2.

TABLE 2

| Sample | Ratio of $Si_3N_4$ (vol %) | Coercive force (Oe) | Vertical magnetization (emu/cc) | In-surface magnetization (emu/cc) | Curie temp. (°C.) | Corrosion test |
| --- | --- | --- | --- | --- | --- | --- |
| Ref. EX. 2 | 5 | 2000 | 65 | 20 | 230 | x |
| ↓ 3 | 10 | 1000 | 40 | 30 | 110 | Δ |
| ↓ 4 | 20 | 50 | ≦5 | ≦5 | — | ○ |

TABLE 2-continued

| Sample | | Ratio of $Si_3N_4$ (vol %) | Coercive force (Oe) | Vertical magnetization (emu/cc) | In-surface magnetization (emu/cc) | Curie temp. (°C.) | Corrosion test |
|---|---|---|---|---|---|---|---|
| ↓ | 5 | 30 | 50 | ≦5 | ≦5 | — | ⊙ |
| Ref. EX. | 6 | 20 | 2000 | 50 | 40 | 190 | x |
| Example | 10 | 20 | 4000 | 50 | 30 | 180 | ⊙ |

EXAMPLES 11–20

Samples were prepared in a similar manner as in the Examples 1–9 except that there were employed different rare earth-transition metal alloy targets 2, 3 and different non-magnetic targets 4, 5, and were evaluated in a similar manner. The obtained results are summarized in Tab. 3. The revolution of the substrate and the deposition speed were so regulated as to obtain a structure cycle of 40–60 Å. As will be observed from Tab. 3, non-magnetic materials which are active and capable of easily bonding with oxygen, water or nitrogen easily reacting with rare earth elements or which are capable of forming a tight protective film, such as Ti, Cr, Si, $Al_2O_3$ or ZnS, can form periodical structures with various rare earth-transition metal alloy magnetic materials to achieve, in the recording layer, a high anticorrosion resistance and a high sensitivity (due to lowered Curie temperature) which have not been achievable in the conventional single layer of rare earth-transition metal magnetic alloy.

TABLE 3

| Sample | Composition of magnetic material | Composition of non-magnetic material | Ratio of of non-magnetic material (Vol. %) | Coercive force (Oe) | Vertical magnetization (emu/cc) | In-surface magnetization (emu/cc) | Curie temp. (°C.) | Corrosion test |
|---|---|---|---|---|---|---|---|---|
| Ex. 11 | $Gd_{12}Tb_{12}Fe_{76}$ | Ti | 10 | 5000 | 90 | ≦5 | 150 | ⊙ |
| ↓ 12 | " | Ti | 30 | 4500 | 80 | ≦5 | 150 | ⊙ |
| ↓ 13 | $Dy_{25}Fe_{55}Co_{20}$ | Cr | 5 | 9000 | 70 | ≦5 | 220 | ⊙ |
| ↓ 14 | " | Cr | 20 | 6000 | 50 | ≦5 | 200 | ⊙ |
| ↓ 15 | $Tb_{20}Fe_{80}$ | Si | 15 | 9000 | 75 | ≦5 | 135 | ⊙ |
| ↓ 16 | " | Si | 30 | 8000 | 70 | ≦5 | 130 | ⊙ |
| ↓ 17 | $Tb_{18}Ho_4Fe_{70}Co_8$ | $Al_2O_3$ | 8 | 6000 | 70 | ≦5 | 200 | ⊙ |
| ↓ 18 | " | $Al_2O_3$ | 17 | 5500 | 65 | ≦5 | 190 | ⊙ |
| ↓ 19 | $Gd_{25}Fe_{50}Co_{25}$ | ZnS | 10 | 1500 | 50 | ≦5 | 280 | o |
| Ex. 20 | " | ZnS | 20 | 1000 | 35 | ≦5 | 250 | o |

Reference Examples

In the Reference Examples 7–16, film formation was conducted with the composite targets employed in the Reference Examples 2–5 in such a manner that the ratios of the magnetic material to the non-magnetic material are the same as those in the Examples 11–20. The obtained film did not have the periodical structure but was a mixture of the magnetic and non-magnetic materials.

The obtained samples of the Reference Examples 7–16 were evaluated as in the Examples 11–20, and the obtained results are summarized in Tab. 4.

In comparison with the results of the Examples 11–20 shown in Tab. 3, the samples of the Reference Examples showed a lower vertical magnetization and a larger decrease of Curie temperature, even in a same ratio of the non-magnetic material. These phenomena are due to a lowered magnetic property due to the mixing of the non-magnetic material into the magnetic material, and these samples are identified as undesirable recording layers. Also in the corrosion test, the samples of the Reference Examples were more easily corroded even in a same ratio of the non-magnetic material.

TABLE 4

| Sample | Composition of magnetic material | Composition of non-magnetic material | Ratio of of non-magnetic material (vol. %) | Coercive force (Oe) | Vertical magnetization (emu/cc) | In-surface magnetization (emu/cc) | Curie temp. (°C.) | Corrosion test |
|---|---|---|---|---|---|---|---|---|
| Ref. Ex. 7 | $Gd_{12}Tb_{12}Fe_{76}$ | Ti | 10 | 5500 | 90 | ≦5 | 155 | Δ |
| ↓ 8 | " | Ti | 30 | 3500 | 65 | ≦5 | 120 | o |
| ↓ 9 | $Dy_{25}Fe_{55}Co_{20}$ | Cr | 5 | 9000 | 70 | ≦5 | 230 | Δ |
| ↓ 10 | " | Cr | 20 | 2000 | 30 | ≦5 | 150 | ⊙ |
| ↓ 11 | $Tb_{20}Fe_{80}$ | Si | 15 | 9000 | 75 | ≦5 | 140 | Δ |
| ↓ 12 | " | Si | 30 | 8000 | 70 | ≦5 | 130 | Δ |
| ↓ 13 | $Tb_{18}Ho_4Fe_{70}Co_8$ | $Al_2O_3$ | 8 | 2000 | 30 | 10 | 170 | x |
| ↓ 14 | " | $Al_2O_3$ | 17 | 500 | 20 | ≦5 | 120 | Δ |
| ↓ 15 | $Gd_{25}Fe_{50}Co_{25}$ | ZnS | 10 | 500 | 30 | 20 | 120 | x |
| Ref. Ex. 16 | " | ZnS | 20 | 100 | 15 | ≦5 | 40 | x |

The results of the foregoing Examples 1–20 and the Reference examples 1–16 indicate that the films with periodical structure of the rare earth-transition metal alloy and the non-magnetic material have better magnetic properties and better anticorrosion resistance, in comparison with the single layers of rare earth-transition metal alloys or the mixed layers of rare earth transition metal alloy and non-magnetic material.

EXAMPLES 21–27

The recording media with the recording layer of the present invention were prepared in the following manner. Polycarbonate disk substrates of a diameter of 130 mm and a thickness of 1.2 mm, provided in advance with guide grooves and address pits were subjected to the formation of recording film in the same manner as in the Examples 11–20, and were subjected to signal recording and reproduction. The film formation was conducted in the following manner. Rare earth-transition metal alloy targets were used as the targets 2, 3 in FIG. 1, and non-magnetic targets were used as the targets 4, 5, for forming the rare earth-transition metal alloy single films or the films with periodical structure of the rare earth-transition metal films and non-magnetic films.

Also, for the purpose of comparison, composite targets obtained by adhering chips of non-magnetic material to rare earth-transition metal alloy targets were used as the targets 2, 3, as in the Reference Examples 7–16 for forming films of mixtures of the rare earth-transition metal alloy and the non-magnetic material.

In addition a new $Si_3N_4$ target 10 was provided in order to form protective layers for sandwiching the recording film.

The above-mentioned polycarbonate substrate was set on the substrate holder 1, and the film formation was started when the vacuum chamber 6 was evacuated to $3 \times 10^{-4}$ Pa after evacuation of about 20 minutes, or to $3 \times 10^{-5}$ Pa after evaluation of about 12 hours. After the pressure of the sputtering chamber was adjusted to $5 \times 10^{-1}$ Pa by the introduction of argon gas, a $Si_3N_4$ protective film was formed, if necessary, by supplying the $Si_3N_4$ target 10 with a high-frequency power of 200 W, and a film of ca. 700 Å was prepared in 7 minutes.

Recording films of ca. 900 Å were prepared with various targets shown in Tab. 5. The revolution of the substrate and the film forming speed were so regulated as to obtain a structure cycle of 40–70 Å. After the film formation, the substrate was coated with hot-melt resin in a thickness of ca. 15 μ to complete the sample of magnetooptical disk.

Each of the magnetooptical disks (Examples 21–28 and Reference Examples 17–26) was set on a recording/reproduction apparatus, and was subjected to an erasing operation at a linear speed of ca. 8 m/sec., with a laser beam of a wavelength of 830 nm and of a laser power of 6 mW concentrated to a spot of ca. 1 μm and with an erasing bias magnetic field of 400 Oe, and then to a recording operation with a laser beam of a power of 4.5 mW modulated with a frequency of 2 MHz, and with a recording bias field of 200 Oe (opposite to the erasing bias field). The reproduction of the recorded signals is conducted with a continuous light beam of 1.0 mW.

Obtained results are summarized in Tab. 5. In the vacuum of $3 \times 10^{-4}$ Pa, the polycarbonate substrate still show significant liberation of gaseous components such as water, and there may result incorporation of these gaseous components into the film or formation of an absorbed film of these gaseous components on the deposited film when the substrate becomes distant from the sputtering source in the course of film formation. The $Si_3N_4$ protective film is capable of preventing migration of the gaseous components from the polycarbonate substrate to the recording film in the course of film formation, and is usually provided for this purpose.

Let us consider the results of Tab. 5 in consideration of the evacuating condition and the presence or absence of $Si_3N_4$ protective film. Among the single-layered samples of the Reference Examples 17–20, the Reference Example 20 obtained with sufficient evacuation and with a $Si_3N_4$ protective film showed a satisfactory reproduction C/N value and a high coercive force, but the magnetic property could not be found by the absence of either condition (Reference Examples 17–19). Also among the samples of the Reference Examples 21–26 in which Ti or $Si_3N_4$ is mixed in the recording layer, the magnetic property is obtained even under less desirable film forming conditions such as the Reference Example 22 in which the magnetic property is obtained by providing the protective film even under evacuation of $3 \times 10^{-4}$ Pa, but the deterioration of reproduction C/N ratio is significant due to the mixing of the non-magnetic material ($Si_3N_4$ in this case) even under most desirable film forming condition with evacuation of $3 \times 10^{-5}$ Pa and with the presence of the protective film (Reference Example 26). On the other hand, in the Examples 21–28 in which the recording layer has periodical structure comprising Ti or $Si_3N_4$ and magnetic material (TbFeCo), a satisfactory reproduction C/N ratio can be obtained even under unfavorable film forming condition.

The present invention is not limited to the foregoing embodiments but is subject to various applications. For example, in addition to the magnetooptical disk raised in the foregoing embodiments, the present invention is applicable also to magnetic recording media in which signal recording and reproduction is conducted with a magnetic head. Also the shape of the media is not limited to disk but any shape is applicable such as a card shape, a tape shape, etc.

The present invention includes all these applications as long as they are within the scope of the appended claims.

TABLE 5

| Sample | Composition of magnetic material | Composition of non-magnetic material | Ratio of non-magnetic material (vol %) | Evacuation (Pa) | $Si_3N_4$ protective film | Coercive force (Oe) | Reproduction C/N ratio (dB) | Structure of recording layer |
|---|---|---|---|---|---|---|---|---|
| Ref. Ex. 17 | $Tb_{20}Fe_{68}Co_{12}$ | — | 0 | $3 \times 10^{-4}$ | None | No magnetism | — | Single layer |
| ↓ 18 | " | — | 0 | $3 \times 10^{-4}$ | Present | No magnetism | — | " |
| ↓ 19 | " | — | 0 | $3 \times 10^{-5}$ | None | No magnetism | — | " |
| ↓ 20 | " | — | 0 | $3 \times 10^{-5}$ | Present | 9000 | 55 | " |

TABLE 5-continued

| Sample | Composition of magnetic material | Composition of non-magnetic material | Ratio of non-magnetic material (vol %) | Evacuation (Pa) | $Si_3N_4$ protective film | Coercive force (Oe) | Reproduction C/N ratio (dB) | Structure of recording layer |
|---|---|---|---|---|---|---|---|---|
| ↓ 21 | " | Ti | 10 | $3 \times 10^{-4}$ | Present | No magnetism | — | Mixed layer |
| ↓ 22 | " | " | 30 | $3 \times 10^{-4}$ | Present | 1000 | 25 | " |
| ↓ 23 | " | " | 30 | $3 \times 10^{-5}$ | None | No magnetism | — | " |
| ↓ 24 | " | $Si_3N_4$ | 7.5 | $3 \times 10^{-4}$ | Present | No magnetism | — | " |
| ↓ 25 | " | " | 15 | $3 \times 10^{-5}$ | None | No magnetism | — | " |
| Ref. Ex. 26 | " | " | 15 | $3 \times 10^{-5}$ | Present | 6000 | 45 | " |
| Example 21 | " | Ti | 20 | $3 \times 10^{-4}$ | None | 1200 | 25 | Periodical structure |
| Example 22 | " | " | 20 | $3 \times 10^{-4}$ | Present | 2000 | 40 | Periodical structure |
| Example 23 | $Tb_{20}Fe_{68}Co_{12}$ | Ti | 20 | $3 \times 10^{-5}$ | None | 1700 | 42 | Periodical structure |
| ↓ 24 | " | Ti | 20 | $3 \times 10^{-5}$ | Present | 9000 | 52 | Periodical structure |
| ↓ 25 | " | $Si_3N_4$ | 15 | $3 \times 10^{-4}$ | None | 1000 | 22 | Periodical structure |
| ↓ 26 | " | " | 15 | $3 \times 10^{-4}$ | Present | 3000 | 40 | Periodical structure |
| ↓ 27 | " | " | 15 | $3 \times 10^{-5}$ | None | 1500 | 40 | Periodical structure |
| Example 28 | " | " | 15 | $3 \times 10^{-5}$ | Present | 8500 | 55 | Periodical structure |

I claim:

1. A magnetic recording medium, comprising:

a substrate;

a magnetic recording layer formed on said substrate, said magnetic recording layer comprising a first thin film comprising a rare earth-transition metal magnetic alloy and a second thin film comprising a non-magnetic material selected from the group consisting of $Si_3N_4$ and $Al_2O_3$, wherein said first thin film and said second thin film are alternately laminated, and wherein a combined thickness of a laminated pair of said first thin film and said second thin film is 20 to 50 Å, and wherein said magnetic recording layer comprises 5 to 130 of said laminated pairs.

2. A magnetic recording medium according to claim 1, wherein the ratio of thickness of said first thin film to said second thin film is within a range from 5:5 to 9:1.

3. A magnetic recording medium according to claim 1, wherein the thickness of said first thin film is at least 10 Å.

4. A magnetic recording medium according to claim 1, wherein the thickness of said magnetic recording layer is within a range from 500 to 2000 Å.

5. A magnetic recording medium according to claim 1, wherein at least two of said first thin films have rare earth-transition metal magnetic alloy compositions different from each other.

6. A magnetic recording medium according to claim 1, wherein at least two of said second thin films have non-magnetic material compositions different from each other.

7. A magnetic recording medium according to claim 1, wherein said rare earth-transition metal magnetic alloy is selected from the group consisting of $Tb_{20}Fe_{60}Co_{20}$, $Dy_{25}Fe_{75}$, $Gd_{20}Fe_{50}Co_{30}$, $Gd_{12}Tb_{12}Fe_{76}$, $Tb_{20}Fe_{80}$, $Tb_{18}Ho_4Fe_{70}Co_8$, and $Gd_{25}Fe_{50}Co_{25}$.

8. A magnetic recording medium according to claim 1, wherein said rare earth-transition metal magnetic alloy comprises a rare earth metal selected from the group consisting of Tb, Gd, Dy, Nd, and Ho, and a transition metal selected from the group consisting of Fe, Co, and Ni.

9. A method of producing a magnetic recording medium comprising the steps of:

selecting a substrate;

rotating the substrate;

forming a first thin film comprising a rare earth-transition metal magnetic alloy;

forming a second thin film comprising a non-magnetic material selected from the group consisting of $Si_3N_4$ and $Al_2O_3$ to form a pair of thin films with the first thin film;

repeating said first thin film forming step; and repeating said second thin film forming step, wherein a combined thickness of the pair of thin films is 20 to 50 Å, and wherein the magnetic recording medium comprises 5 to 130 of the pairs of thin films.

10. A method of producing a magnetic recording medium according to claim 9, wherein the rare earth-transition metal magnetic alloy is selected from the group consisting of $Tb_{20}Fe_{60}Co_{20}$, $Dy_{25}Fe_{75}$, $Gd_{20}Fe_{50}Co_{30}$, $Gd_{10}Tb_{12}Fe_{76}$, $Tb_{20}Fe_{80}$, $Tb_{18}Ho_4Fe_{70}Co_8$, and $Gd_{25}Fe_{50}Co_{25}$.

11. A method of producing a magnetic recording medium according to claim 9, wherein the rare earth-transition metal magnetic alloy comprises a rare earth metal selected from the group consisting of Tb, Gd, Dy, Nd, and Ho, and a transition metal selected from the group consisting of Fe, Co, and Ni.

* * * * *

UNITED STATES PATENT AND TRADEMARK OFFICE
CERTIFICATE OF CORRECTION

PATENT NO. : 5,591,515

DATED : January 7, 1997

INVENTOR(S) : YOICHI OSATO

It is certified that error appears in the above-indentified patent and that said Letters Patent is hereby corrected as shown below:

On the title page, item
[57] Abstract

Line 1, "a" should be deleted.

COLUMN 2

Line 29, "will-be" should read --will be--.

COLUMN 3

Line 35, "A'-B'-A'-B"" should read --A'-B'-A"-B"--.

COLUMN 4

Line 26, "mixing" should read --mixing of--.

COLUMN 10

Line 9, "show" should read --shows--.

Signed and Sealed this

Nineteenth Day of August, 1997

Attest:

BRUCE LEHMAN

*Attesting Officer*　　　*Commissioner of Patents and Trademarks*